(12) United States Patent
Smith

(10) Patent No.: US 7,862,100 B1
(45) Date of Patent: Jan. 4, 2011

(54) MOTORCYCLE SEAT COVERING SYSTEM

(76) Inventor: Stanford E. Smith, 403 Chestnut Woods Ct., Greer, SC (US) 29651

( * ) Notice: Subject to any disclaimer, the term of this patent is extended or adjusted under 35 U.S.C. 154(b) by 0 days.

(21) Appl. No.: 12/466,493

(22) Filed: May 15, 2009

(51) Int. Cl.
*B60J 11/02* (2006.01)
*B60J 11/04* (2006.01)

(52) U.S. Cl. .............. 296/136.1; 296/78.1; 160/370.22; 135/88.04; 150/167

(58) Field of Classification Search ............... 296/78.1, 296/98, 136.1, 136.07, 136.08; 160/24, 370.22; 297/184.11, 219.11; 135/88.01, 88.04, 88.11; 150/167
See application file for complete search history.

(56) References Cited

U.S. PATENT DOCUMENTS

| | | | | |
|---|---|---|---|---|
| 1,853,742 A | * | 4/1932 | Owen et al. | ............... 135/88.01 |
| 3,537,746 A | | 11/1970 | Peters | |
| 4,171,145 A | | 10/1979 | Pearson, Sr. | |
| 4,560,196 A | * | 12/1985 | Carter, Sr. | ................... 296/102 |
| D322,054 S | | 12/1991 | Reiter | |
| 5,080,431 A | | 1/1992 | Frazier | |
| 5,294,167 A | * | 3/1994 | Yu | ............................ 242/372 |
| D354,039 S | | 1/1995 | Kuoppala | |
| 5,503,212 A | * | 4/1996 | Lin | ........................ 160/370.22 |
| 5,588,698 A | * | 12/1996 | Hsueh | .................... 297/184.11 |
| 5,795,009 A | | 8/1998 | Sack et al. | |
| 5,820,200 A | * | 10/1998 | Zubillaga et al. | ....... 296/136.03 |
| 6,012,770 A | | 1/2000 | Rubin | |
| 6,655,736 B1 | * | 12/2003 | Arenas | ....................... 297/229 |
| 6,682,123 B2 | | 1/2004 | Burks et al. | |
| 6,725,807 B1 | * | 4/2004 | Tapia | ........................... 119/496 |
| 6,981,509 B2 | * | 1/2006 | Sharapov | ................. 135/88.11 |
| 7,090,282 B2 | * | 8/2006 | Li | ............................. 296/136.1 |
| 7,175,222 B2 | * | 2/2007 | Gray et al. | ................. 296/78.1 |
| 2006/0208522 A1 | * | 9/2006 | Gray et al. | ................. 296/78.1 |

* cited by examiner

*Primary Examiner*—Patricia L Engle

(57) ABSTRACT

A motorcycle seat covering system includes a motorcycle having a frame, handlebars, seat and rack extending rearward of the seat. A housing has a pair of end walls and a perimeter wall extending between the end walls. The housing has an elongated opening therein. A coupling assembly couples the housing to the handlebars. A spindle is mounted within the housing and extends through a sleeve. A biasing member biases rotation of the sleeve in a first direction with respect to the spindle. A flexible panel is attached to the sleeve and has a free end extending outwardly of the housing through the slot. The panel is rolled up onto the sleeve when the sleeve is rotated in the first direction. A fastener is attached to the free end and is releasably attached to the rack when the panel is pulled outwardly from the housing to cover the seat.

4 Claims, 4 Drawing Sheets

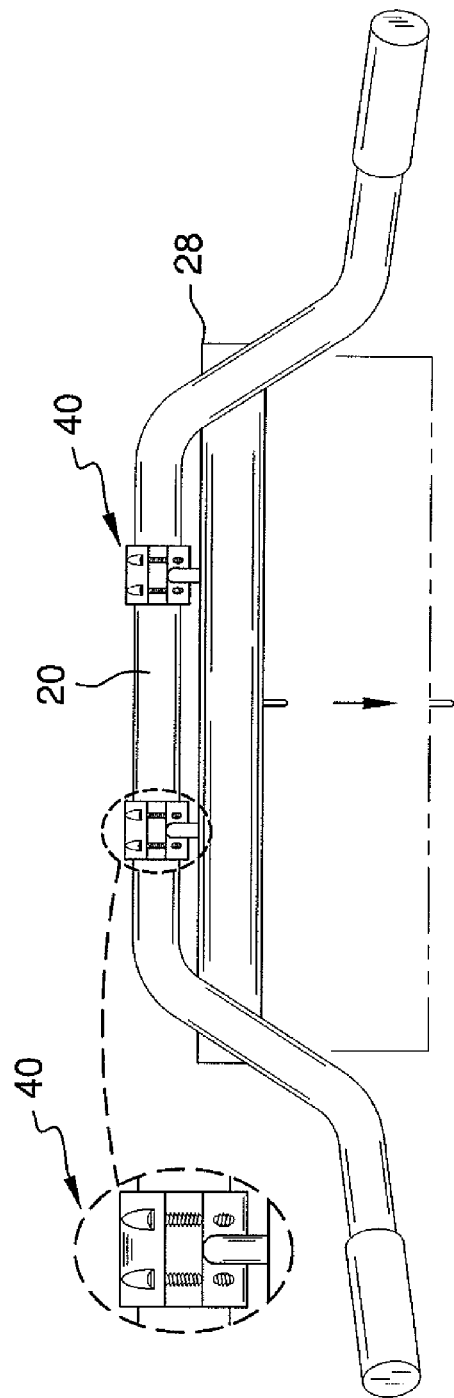
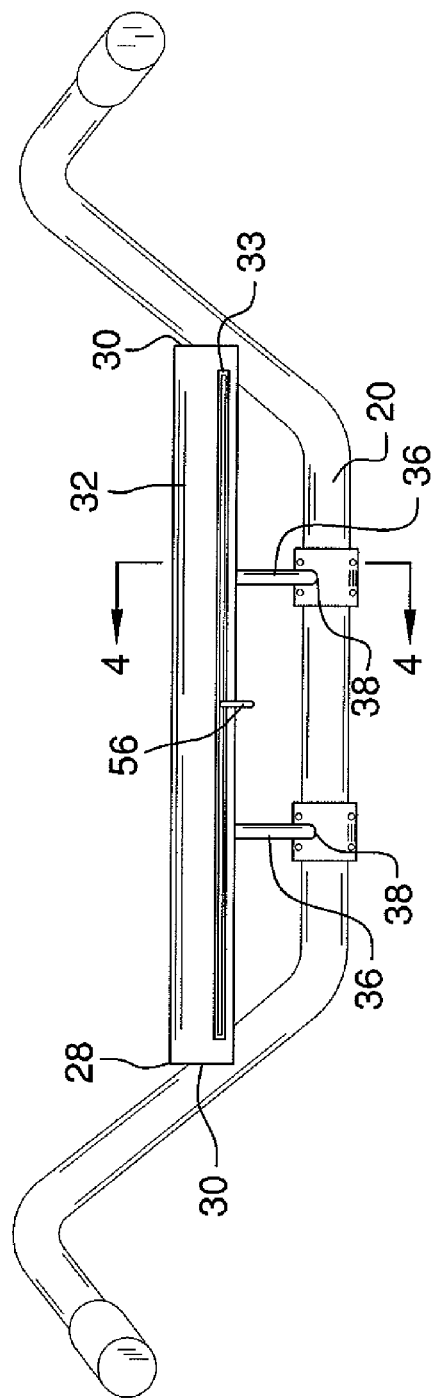

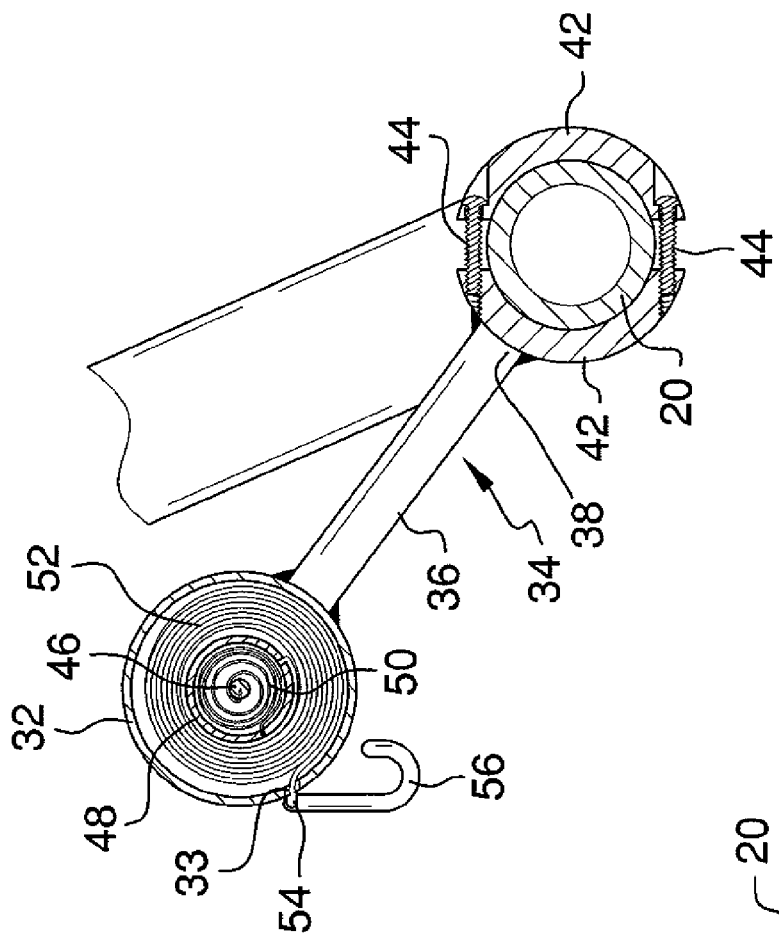
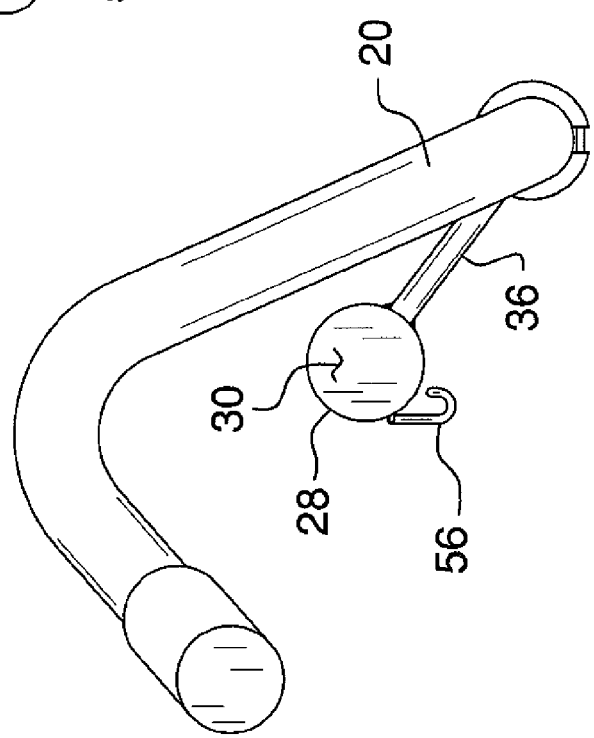

MOTORCYCLE SEAT COVERING SYSTEM

BACKGROUND OF THE DISCLOSURE

Field of the Disclosure

The disclosure relates to seat covering devices and more particularly pertains to a new seat covering device for protecting an upper side of a motorcycle from the elements.

SUMMARY OF THE DISCLOSURE

An embodiment of the disclosure meets the needs presented above by generally comprising a motorcycle including a frame, a front wheel and a rear wheel each rotatably coupled to the frame, a pair of handlebars pivotally coupled to the frame to pivot the front wheel, an engine is mounted on the frame and a seat is mounted on the frame. The seat is positioned between the front and rear wheels and a rack is attached to the frame and extends rearward of the seat. A housing has a pair of end walls and a perimeter wall that is attached to and extends between the end walls. The housing has an elongated opening therein extending between the end walls. A coupling assembly releasably couples the housing to the handlebars. A spindle is mounted within the housing and extends through a sleeve rotatable with respect to the spindle. A biasing member biases rotation of the sleeve in a first direction with respect to the spindle. A flexible panel is attached to the sleeve and has a free end extending outwardly of the housing through the slot. The panel is rolled up onto the sleeve when the sleeve is rotated in the first direction. A fastener is attached to the free end and is releasably attached to the rack when the panel is pulled outwardly from the housing to cover the seat.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein:

FIG. 1 is a top view of a motorcycle seat covering system according to an embodiment of the disclosure.

FIG. 2 is a front view of an embodiment of the disclosure.

FIG. 3 is a side view of an embodiment of the disclosure.

FIG. 4 is a cross-sectional view taken along line 4-4 of FIG. 2 of an embodiment of the disclosure.

DESCRIPTION OF THE PREFERRED EMBODIMENT

Figure 5:
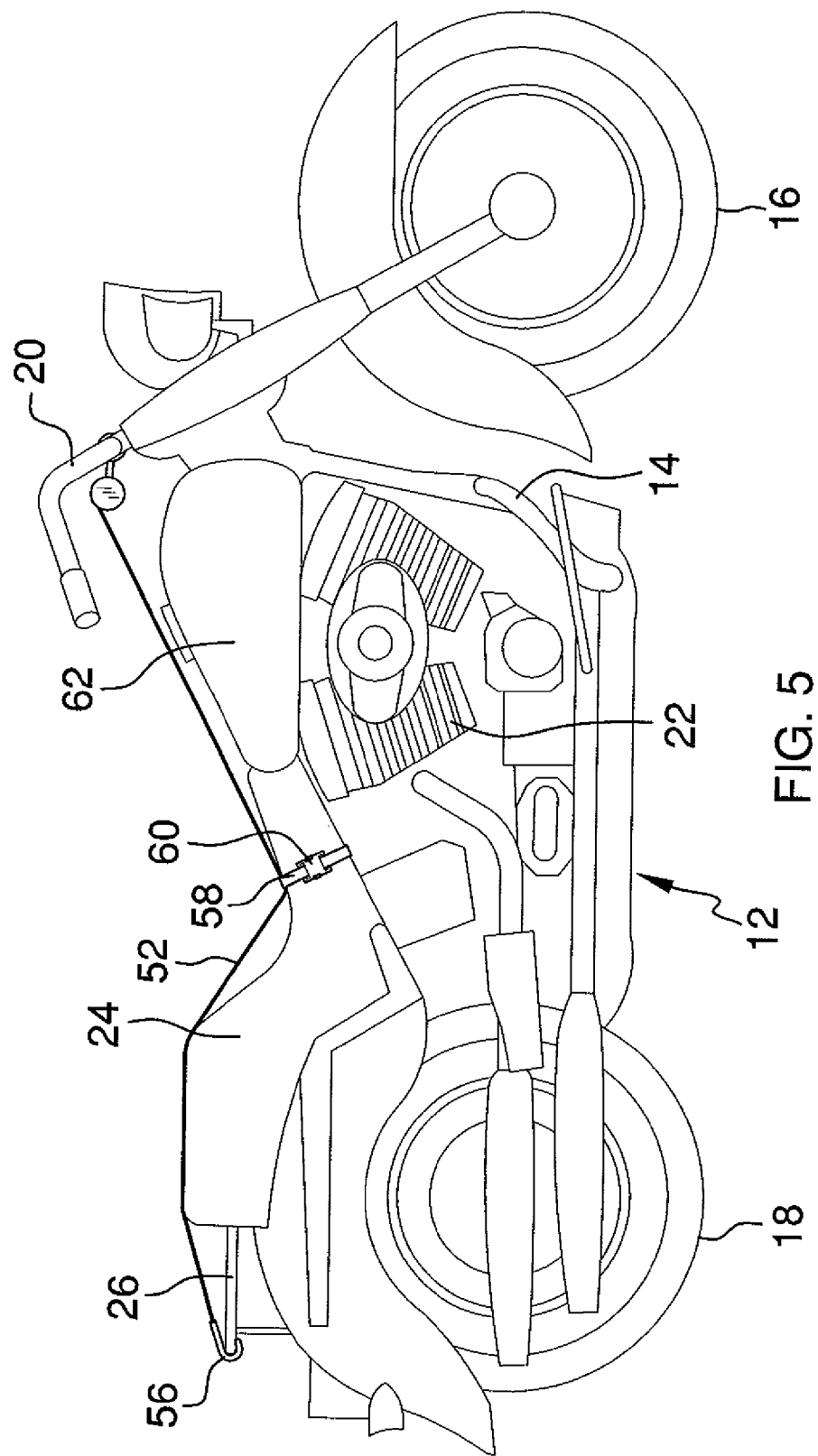
FIG. 5 is a side view of an embodiment of the disclosure.
Figure 6:
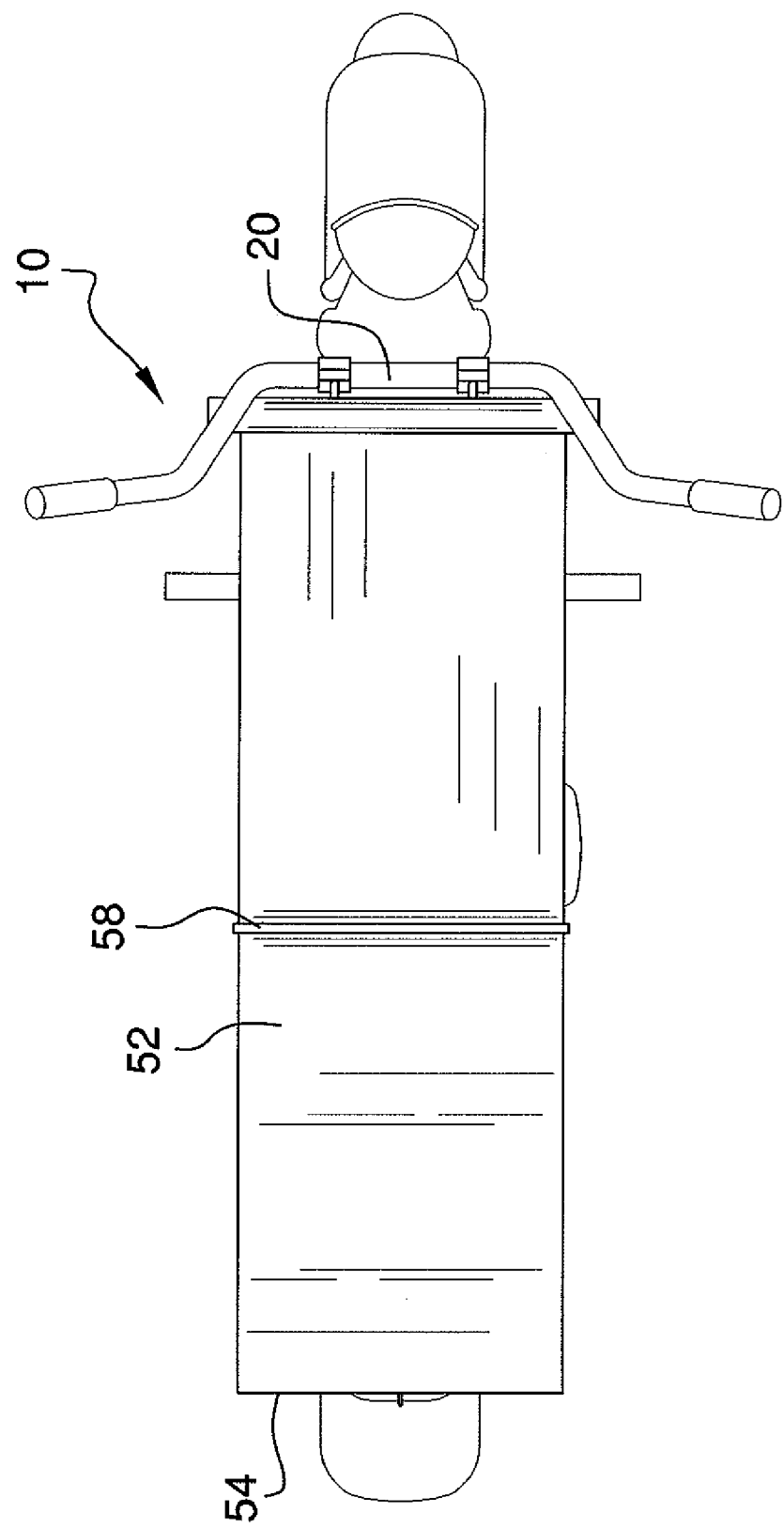
FIG. 6 is a top view of an embodiment of the disclosure.

With reference now to the drawings, and in particular to FIGS. 1 through 6 thereof, a new seat covering device embodying the principles and concepts of an embodiment of the disclosure and generally designated by the reference numeral 10 will be described.

As best illustrated in FIGS. 1 through 6, the motorcycle seat covering system 10 generally comprises a conventional motorcycle 12 that includes a frame 14, a front wheel 16 and a rear wheel 18 each rotatably coupled to the frame 14, a pair of handlebars 20 pivotally coupled to the frame 14 to pivot the front wheel 16, and an engine 22 that is mounted on the frame 12. A seat 24 is mounted on the frame and is positioned between the front 16 and rear 18 wheels. A rack 26 is attached to the frame 14 and extends rearward of the seat 24.

A housing 28 has a pair of end walls 30 and a perimeter wall 32 that is attached to and extends between the end walls 30. The housing 28 has an elongated opening 33 therein extending between the end walls 30. A coupling assembly releasably 34 couples the housing 28 to the handlebars 20. The coupling assembly 34 includes a pair of arms 36 that are attached to and extend away from the housing 28 in a same direction with respect to each other. Each of the arms 36 has a distal end 38 with respect to the housing 28. A pair of clamps 40 is provided. Each of the distal ends 38 has one of the clamps 40 attached thereto. The clamps 40 are each removably coupled to the handlebars 20. The clamps 40 each includes a pair cylinder sections 42 which are held together with screws 44 and extend around the handlebars 20 as shown in FIG. 4.

A spindle 46 is mounted within the housing 28 and extends through a sleeve 48 rotatable with respect to the spindle 46. A biasing member 50 biases rotation of the sleeve 48 in a first direction with respect to the spindle 46. The biasing member 50 comprises a spring wound about the spindle 46 and is attached to the spindle 46 and the sleeve 48.

A flexible panel 52 is attached to the sleeve 48. The panel 52 has a free end 54 extending outwardly of the housing 28 through the slot 33. The panel 52 is rolled up onto the sleeve 48 when the sleeve 48 is rotated in the first direction. The panel 52 may be comprised of a water-resistant material.

A fastener 56 is attached to the free end 54 and is releasably attached to the rack 26 when the panel 52 is pulled outwardly from the housing 28 to cover the seat 24. The fastener 56 comprises a hook. A strap 58 is removably extended around the seat 24 and the panel 52 to secure the panel 52 to the seat 24 and prevent lateral movement of the panel 52 with respect to the seat 24. The strap 58 includes a buckle 60 for selectively opening or closing strap 58.

In use, when the motorcycle 12 is parked outside, in particular, the panel 52 is extended over the motorcycle 12 to prevent dust, debris and rain from settling on the seat 24. The panel 52 can also be used for protecting and covering a gas tank 62 of the motorcycle 12. When the panel 52 is released from the rack 26, the panel 52 is pulled back into the housing 28. It should be understood that the term "rack" being used is defined as any structural support positioned rearward of the seat 24.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A motorcycle covering system, said system comprising:
   a motorcycle including a frame, a front wheel and a rear wheel each rotatably coupled to said frame, a pair of handlebars pivotally coupled to said frame to pivot said front wheel, an engine being mounted on said frame and a seat being mounted on said frame, said seat being positioned between said front and rear wheels, a rack being attached to said frame and extending rearward of said seat;
   a housing having a pair of end walls and a perimeter wall being attached to and extending between said end walls, said housing having an elongated opening therein extending between said end walls;
   a coupling assembly releasably coupling said housing to said handlebars, wherein said coupling assembly includes;
      a pair of arms being attached to and extending away from said housing in a same direction with respect to each other, each of said arms having a distal end with respect to said housing;
      a pair of clamps, each of said distal ends having one of said clamps attached thereto, each of said clamps being removably coupled to said handlebars, each of said clamps having an aperture for receiving the handlebars, said apertures of said clamps being aligned with each other such that a line is passable through each of said apertures;
   a spindle being mounted within said housing and extending through a sleeve rotatable with respect to said spindle, a biasing member biasing rotation of said sleeve in a first direction with respect to said spindle;
   a flexible panel being attached to said sleeve, said panel having a free end extending outwardly of said housing through said slot, said panel being rolled up onto said sleeve when said sleeve is rotated in said first direction; and
   a fastener being attached to said free end and being releasably attached to said rack when said panel is pulled outwardly from said housing to cover said seat.

2. The system according to claim 1, wherein said fastener comprises a hook.

3. The system according to claim 1, further including a strap being removably extended around said seat and said panel to secure said panel to said seat and prevent lateral movement of said panel with respect to said seat.

4. A motorcycle covering system, said system comprising:
   a motorcycle including a frame, a front wheel and a rear wheel each rotatably coupled to said frame, a pair of handlebars pivotally coupled to said frame to pivot said front wheel, an engine being mounted on said frame and a seat being mounted on said frame, said seat being positioned between said front and rear wheels, a rack being attached to said frame and extending rearward of said seat;
   a housing having a pair of end walls and a perimeter wall being attached to and extending between said end walls, said housing having an elongated opening therein extending between said end walls;
   a coupling assembly releasably coupling said housing to said handlebars, said coupling assembly including;
      a pair of arms being attached to and extending away from said housing in a same direction with respect to each other, each of said arms having a distal end with respect to said housing;
      a pair of clamps, each of said distal ends having one of said clamps attached thereto, each of said clamps being removably coupled to said handlebars, each of said clamps having an aperture for receiving the handlebars, said apertures of said clamps being aligned with each other such that a line is passable through each of said apertures;
   a spindle being mounted within said housing and extending through a sleeve rotatable with respect to said spindle, a biasing member biasing rotation of said sleeve in a first direction with respect to said spindle;
   a flexible panel being attached to said sleeve, said panel having a free end extending outwardly of said housing through said slot, said panel being rolled up onto said sleeve when said sleeve is rotated in said first direction;
   a fastener being attached to said free end and being releasably attached to said rack when said panel is pulled outwardly from said housing to cover said seat, said fastener comprising a hook; and
   a strap being removably extended around said seat and said panel to secure said panel to said seat and prevent lateral movement of said panel with respect to said seat.

* * * * *